United States Patent

[11] 3,614,036

| [72] | Inventor | Jimmie L. Foster |
| | | Granada Hills, Calif. |
| [21] | Appl. No. | 865,842 |
| [22] | Filed | Oct. 13, 1969 |
| [45] | Patented | Oct. 19, 1971 |
| [73] | Assignee | Collins Radio Company |
| | | Cedar Rapids, Iowa |

[54] CONVERSION PRINCIPLE-ANGLE OF ATTACK TO AIRSPEED
6 Claims, 3 Drawing Figs.

[52] U.S. Cl.............................................. 244/77 D, 244/77 A
[51] Int. Cl.............................................. B64c 13/18
[50] Field of Search..................................... 244/77, 77 A, 77 D; 73/178, 180; 235/150.22

[56] References Cited
UNITED STATES PATENTS
3,522,729  8/1970  Miller.......................... 244/77 D X

*Primary Examiner*—Milton Buchler
*Assistant Examiner*—Jeffrey L. Forman
*Attorneys*—Richard W. Anderson and Robert J. Crawford ABSTRACT: A conversion principle and implementation means for permitting linear airspeed input increments to be introduced into an angle of attack referenced control system for an aircraft by means of which the normal margin over stall speed controlled by the system, such as $1.3V_s$, may be increased by a desired incremental airspeed $\Delta V$. The selected incremental airspeed $\Delta V$ is converted to an equivalent incremental angle of attack parameter which is added to the reference angle of attack parameter normally used in the system control computations.

INVENTOR.
JIMMIE L. FOSTER
BY R. W. Anderson
AGENT

CONVERSION PRINCIPLE-ANGLE OF ATTACK TO AIRSPEED

This invention relates generally to autothrottle control systems for aircraft and more particularly to a means for introducing incremental airspeed control increments into an angle of attack referenced autothrottle control systems.

A known autothrottle control system for aircraft operates on an angle of attack reference; that is, a throttle control system which will cause the aircraft to attain an airspeed of $1.3V_s$, where $V_s$ is the stall speed for a particular flap setting and angle of attack. Thus the aircraft is caused to attain an airspeed which is roughly 30 percent greater than the stall speed for a particular configuration and attitude. The $0.3V_s$ margin is a safety factor.

Under certain conditions, such as during landing when wind gusts may be present, the pilot may wish to increase the safety margin afforded by the $1.3V_s$ control, since headwind gusts, for example, may appreciably reduce airspeed and lift, and under some conditions, may be sufficient in their effect on the flight control that the $1.3V_s$ margin is marginal. Pilots therefore may wish to increase the percentage of stall margin. In an angle of attack referenced system, the increase in safety margin would have to be in the form of angle of attack increments, that is, the system performing control computations would have to be provided with an incremental angle of attack parameter inserted by the pilot such that the ultimate control of $1.3V_s$ would be increased by some value $\Delta V$.

A means such as a manual adjustment knob may then be provided for the pilot to increase the stall margin, However, a $\Delta \alpha$ or incremental angle of attack setting would be somewhat meaningless to the pilot. The pilot wishes to insert a control in terms of airspeed increments whereas the system is not directly controlled by this parameter. An object of the present invention, therefore, is to provide, in an angle of attack referenced autothrottle control system for an aircraft, a means by which the pilot may be provided with a linear $\Delta V$ control in terms of incremental airspeed increments, such as 10 knots, 20 knots, 30 knots, which will provide the computation system with a corresponding incremental angle of attack input to attain the selected increase in stall margin. The pilot may then set a control which might be labeled $1.3V_s + \Delta V$ —the pilot inserting $\Delta V$ in terms of desired incremental airspeed increases over stall margin.

The pilot, in selecting an incremental speed setting over $1.3V_s$ actually introduces into the control computations an incremental reference angle of attack $\Delta \alpha_r$, that is, the angle of attack increment equivalent to the selected airspeed increment.

The present invention is accordingly featured in the provision, in an angle of attack referenced autothrottle control system, of a conversion network whereby linear incremental airspeed input increments may be converted to corresponding incremental angle of attack increments for subsequent control computation to effect the desired $\Delta V$ value in the airspeed stall margin expression, $1.3V_s + \Delta V$.

These and other objects and features of the present invention may be realized by reading the auto throttle description in conjunction with the accompanying drawings in which:

FIG. 1 diagrammatically illustrates the function between the coefficient of lift of a given aircraft wing configuration and angle of attack.

Figure 2:
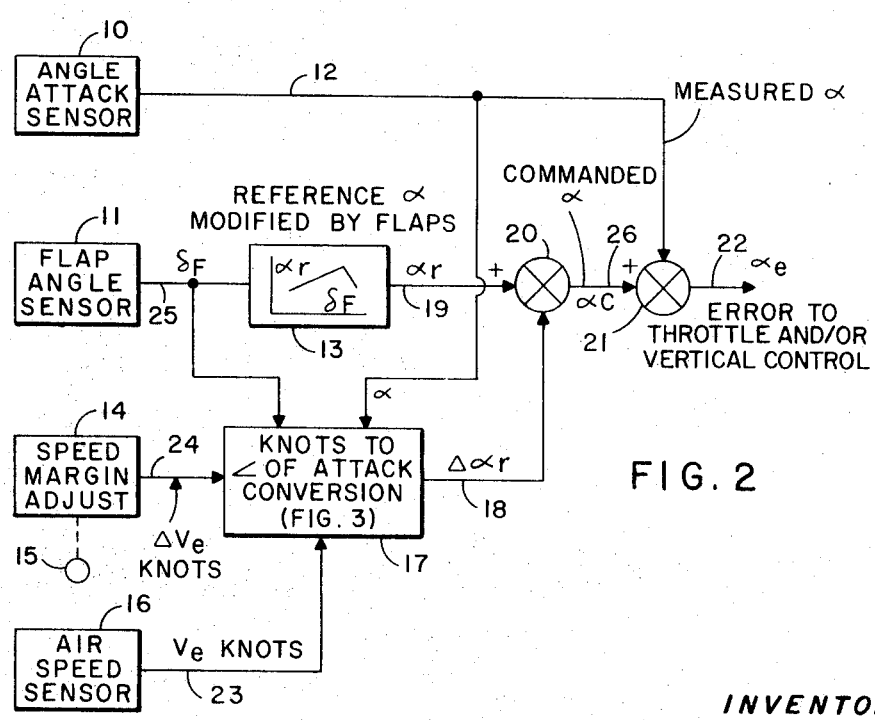
FIG. 2 is a functional block diagram of an angle of attack referenced autopilot control computation including the means to insert incremental speed margin adjustments over the normal $1.3V_s$ control afforded by such a system.

FIG. 2 illustrates functionally, in the upper portion thereof, the development of an error signal in a known type of autothrottle control system for aircraft, the error signal corresponding to the discrepancy between the measured or experienced angle of attack $\alpha$ and a commanded angle of attack $\alpha_c$. Accordingly an angle of attack sensor 10 develops an output 12 for application as a first input to a mixer 21, this input being the measured angle of attack $\alpha$ at any instant. A referenced angle of attack $\alpha_r$ based on $1.3V_s$ is obtained from a shaping circuitry 13 and corresponds to an angle of attack for the particular aircraft the attainment of which will assure that the airspeed of the aircraft is maintained at $1.3V_s$. The circuitry providing the $\alpha_r$ reference 19 is provided with an input 25 from a flap angle sensor 11, since the angle of attack reference for a particular wing configuration is a function of flap angle. Thus the output 19 from the circuitry 13 represents a referenced angle of attack $\alpha_r$, which may be selected for a particular wing configuration and flap position as one which will assure that the aircraft speed be controlled at $1.3V_s$ when the discrepancy between the reference 19 and the actual measured parameter 12, as developed in mixer 21, is utilized to control the aircraft by application to the engine throttle or as a command signal to the aircraft pitch control autopilot circuitry to complete the control loop.

In accordance with the present invention the basic circuitry depicted in the uppermost portion of FIG. 2 is supplemented by a means whereby the pilot may insert in the control loop an input incremental speed margin adjustment as depicted by functional block 14 and control knob 15. As above discussed, an incremental speed margin adjustment must be converted to a corresponding incremental angle of attack parameter for use in an angle of attack reference control system. Thus the output 24 from the speed margin adjust 14, which corresponds to $\Delta V$ knots is applied to a knots-to-angle-of-attack conversion circuitry 17. The output 18 from the conversion circuitry 17, as will be further described, corresponds to $\Delta \alpha_r$ and is applied to a mixer 20 in conjunction with the reference angle of attack input parameter 19. The output for mixer 20 corresponds to $\alpha_c$, the commanded angle of attack, it being realized that $\alpha_c$ then corresponds to the normal reference angle of attack which guarantees $1.3V_s$ airspeed increased by some angle of attack input increment $\Delta \alpha_r$ such that the control is modified to attain an airspeed of $1.3V_s$ plus $\Delta V$, the latter parameter being inserted in a linear fashion by the pilot by means of the speed margin adjustment circuitry and control knob 15. The output mixer 21 then develops an error signal $\alpha_e$ corresponding to the discrepancy between the measured angle of attack from sensor 10 and the modified reference angle of attack which now corresponds to $\alpha_r + \Delta \alpha_r$. The conversion circuitry 17 is provided, in addition to the linear $\Delta V_e$ input 24 from the speed margin adjustment 14, with an airspeed input signal 23 from an airspeed sensor 16, an input parameter $d_f$ from flap angle sensor 11 and the measured angle of attack 12 from angle of attack sensor 10. The four illustrated inputs to the conversion circuitry 17 stem from a conversion principle in accordance with the present invention the consideration of which will now be discussed.

Since the autothrottle control system under consideration here may be employed in critical flight situations such as approach, it is desirable that the incremental airspeed adjustments to the basic control be accomplished on an equilibrium basis where airspeed is changed without changing lift. It is desirable that the change in airspeed be accomplished without affecting the vertical profile of the flight path, it being understood that the philosophy here is to insert an increase in airspeed safety factor over and above that afforded by the basic control. Considering then an equilibrium basis, we may consider that aircraft weight $W$ = lift $L$. An incremental relationship between angle of attack and airspeed may now be considered based on the hypothesis that $W=L$.

From the coefficient of lift versus angle of attack relationship we can write:

$$C_L = C_{L\alpha}(\alpha - \alpha_0); \qquad (1)$$

Figure 1:
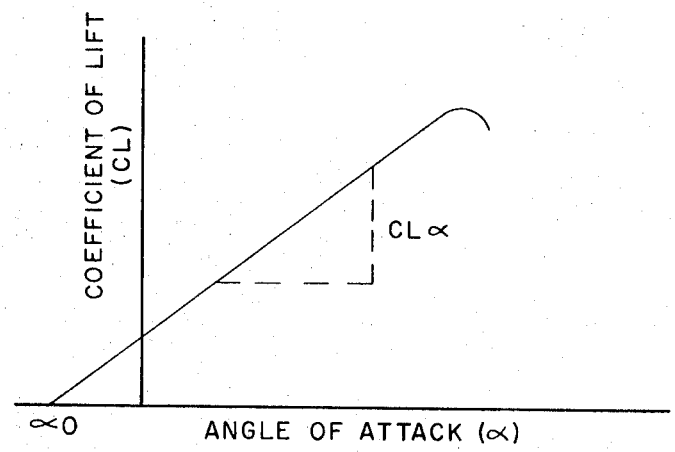

Which is the expression for the straight line of FIG. 1 where:

$C_L$ = coefficient of lift
$C_{L\alpha}$ = slope
$\alpha$ = angle of attack variable
$\alpha_0$ = angle of attack for zero coefficient of lift For equilibrium flight:

$$W = L \quad (2)$$

Lift may be expressed as:

$$L = C_L S_q \quad (3)$$

where $S$ = wing area
$q$ = dynamic pressure

Dynamic pressure may be expressed as:

$$q = \tfrac{1}{2} \rho V_e^2 \quad (4)$$

where $\rho$ = atmospheric density
$V_e$ = equivalent airspeed

Substituting expressions (1) and (4) for the terms $C_L$ and $q$ of expression (3) we arrive at:

$$L = \tfrac{1}{2} \rho_0 S C_{L\alpha}(\alpha - \alpha_0) V_e^2 \quad (5)$$

And from the relationship (2) we can write:

$$W = \tfrac{1}{2} \rho_0 S C_{L\alpha}(\alpha - \alpha_0) V_e^2 \quad (6)$$

Expressing $V_e$ as $(V_e + \Delta V_e)$ and $\alpha$ as $(\alpha + \Delta\alpha)$ to establish an exact incremental relationship between incremental airspeed $\Delta V_e$ and incremental angle of attack $\Delta\alpha$ and rearranging expression (6) results in the following:

$$(V_e + \Delta V_e)^2 - V_e^2 = \frac{W}{1/2\rho_0 SCL\alpha} \left[\frac{1}{\alpha + \Delta\alpha - \alpha_0} - \frac{1}{\alpha - \alpha_0}\right] \quad (7)$$

Now replacing W in (7) by its equivalent from (6) we have:

$$(V_e + \Delta V_e)^2 - V_e^2 = V_e^2(\alpha - \alpha_0)\left[\frac{1}{\alpha + \Delta\alpha - \alpha_0} - \frac{1}{\alpha - \alpha_0}\right] \quad (8)$$

Expanding the polynomial, dividing through by $V_e^2$ and rearranging expression (8) results in:

$$\Delta\alpha = [\alpha - \alpha_0]\left[\left(\frac{V_e}{V_e + \Delta V_e}\right)^2 - 1\right] \quad (9)$$

Implementation of relationship (9) allows linear airspeed bias increments to produce the required increments in angle of attack command.

Figure 3:
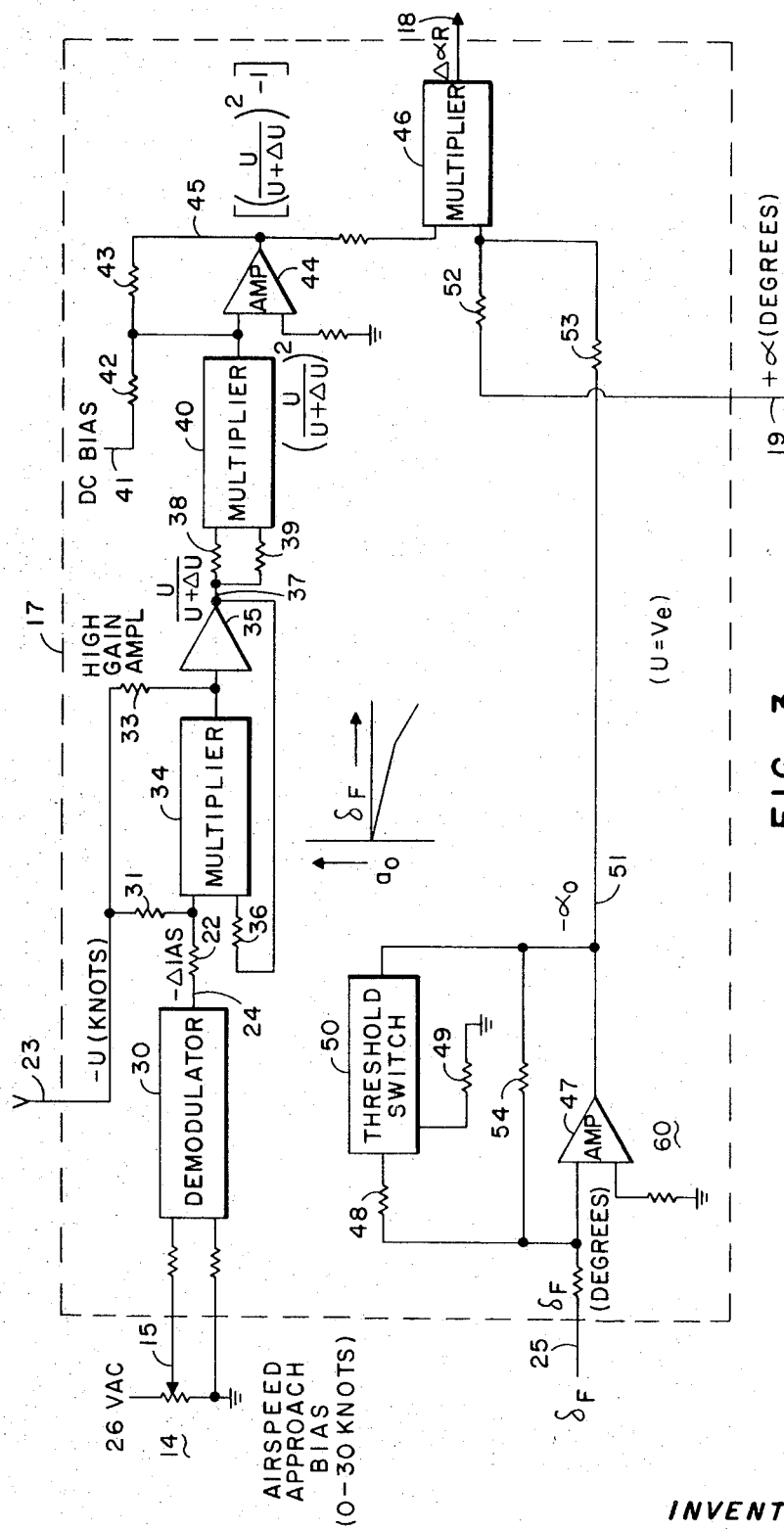
FIG. 3 is a functional schematic diagram of the conversion system in accordance with the principles of this invention whereby linear airspeed input increments are converted to corresponding angle of attack increments for use in the computations of the system of FIG. 2.

Expression (9) presents a relationship between incremental angle of attack increments as a function of the actual angle of attack $\alpha$, the angle of attack $\alpha_0$ corresponding to zero lift, the equivalent airspeed $V_e$, and the incremental equivalent airspeed input parameter $\Delta V_e$. From this relationship one may develop a signal corresponding to the incremental angle of attack parameter $\Delta\alpha$ for any incremental airspeed parameter $\Delta V_e$ which may be inserted by the pilot. Reference is made to FIG. 3 which illustrates an implementation for solution of the expression (9). Equivalent airspeed $V_e$ is assumed to be equivalent to calibrated airspeed at the approach speeds where the compressibility effect is negligible.

With reference to FIG. 3 the incremental airspeed inputs might be derived from a linear potentiometer 14 by selected settings of the potentiometer wiper arm identified by reference numeral 15, corresponding to the control knob 15 of FIG. 1. The potentiometer might be connected to an alternating current source and hence the output might be applied to a demodulator 30 to develop an output 24 corresponding to a DC signal proportional to the incremental airspeed adjustment $\Delta V_e$ selected by the pilot. The incremental airspeed signal 24 and the actual airspeed 23 (as obtained from the airspeed sensor 16 of FIG. 2) are then applied to a circuitry comprised of a multiplier 34 and a high-gain amplifier 35 to develop an output 37 corresponding to the quotient $V_e(V_e + \Delta V_e)$. The airspeed signal 23 is applied through a resistor 31 and mixed with the incremental airspeed signal $\Delta V_e$ from demodulator 30 as applied through resistor 32 as a first input to the multiplier 34. The airspeed signal 23 is additionally applied through resistor 33 and mixed with the output from multiplier 34 for application to the high-gain amplifier 35. The output from high-gain amplifier 35 is taken through a feedback loop and resistor 36 as a second input to multiplier 34. The output 37 from high-gain amplifier 35 corresponds to $V_e/(V_e + \Delta V_e)$, the combination of the multiplier and high-gain amplifier acting as an implicit dividing function.

Reference to expression (9) illustrates that the incremental angle of attack signal is a function of two products, the second of which includes the quotient derived at the output of high-gain amplifier 35. The output 37 from amplifier 35 is then applied through resistors 38 and 39, respectively, as first and second inputs to a further multiplier 40 such that the output of multiplier 40 corresponds to $[V_e/(V_e + \Delta V_e)]^2$. The output from multiplier 40 may then be applied to a differential operational amplifier 44 which includes a feedback loop comprising resistor 43, resistor 42, and a DC bias source 41, such that the output 45 from amplifier 44 corresponds to the second factor of expression (9).

The output 45 from amplifier 44, corresponding to the second factor of expression (9) above, is applied as a first input to a further multiplier 46.

Remaining circuitry in the implementation of FIG. 3 develops the expression $(\alpha - \alpha_0)$, the first factor of expression (9). For this purpose an input 25 corresponding to flap position is applied to a shaping network generally identified by reference numeral 60 from which a signal 51 corresponding to $\alpha_0$ (the angle of attack corresponding to zero lift) is derived. Thus the flap position input 25 is applied to an amplifier 47 which includes a feedback resistor 54 and a paralleled feedback network comprised of resistor 48, a threshold sensitive switch 50, and a resistor 49 the combined action of which develops an output 51 proportional to the particular value of $\alpha_0$ for a given flap setting. The $\alpha_0$ signal 51 is applied through a resistor 53, and the actual measured angle of attack 19 is applied through a resistor 52 to a common mixing point signal as a second input to output multiplier 46. It is to be understood that the particular algebraic signs depicted in FIG. 3 may be implemented by particular DC polarities. Multiplier 46 thus receives input signals respectively proportional to the two factors in expression (9) the product of which equals the incremental angle of attack under consideration here. Thus the output 18 from multiplier 46 corresponds to $\Delta\alpha_r$, and, as above described, is added to the system reference $\alpha_r$ to formulate the command angle of attack $\alpha_c$ for comparison with the measured angle of attack. The discrepancy between these two signals corresponds to an error signal which may be used for subsequent throttle and/or aircraft vertical control computations, in either case the aircraft being caused to experience an airspeed, in excess of the $1.3V_s$ airspeed normally effected, by an incremental airspeed adjustment $\Delta V_e$, the latter being arbitrarily inserted by the pilot for increase of stall safety margin as desired.

It is thus seen that the present invention provides a means enabling a pilot to linearly insert airspeed adjustments in an angle of attack controlled autothrottle or vertical control circuitry by providing a conversion means whereby the airspeed increments set in by the pilot are applied to the system computation as corresponding angle of attack increments.

I claim:

1. In an aircraft control circuitry of the type including the development of an error signal based on the discrepancy between a computed reference angle of attack and a sensor-measured angle of attack, said error signal being utilized in control circuitry to control the airspeed of the craft as a predetermined function of the stall speed of the craft for a particular angle of attack as defined by said reference angle of attack input parameter; means for selectively modifying said predetermined stall speed function by incremental linear airspeed input increments, said latter means comprising computer means for converting said linear incremental airspeed increments to equivalent angle of attack increments, means for combining said equivalent angle of attack increments with said reference angle of attack signal to formulate an angle of attack command signal, and means for comparing said angle of attack command signal with said measured angle of attack input parameter to develop said error signal.

2. Control means as defined in claim 1 wherein said means for modifying comprises signal-generating means supplying a first signal proportional to a selected one of said incremental linear airspeed input increments, means for developing a second signal proportional to the measured angle attack of the aircraft, means for developing a third signal proportional to the angle of attack corresponding to zero lift for said aircraft, means for developing a fourth signal proportional to the airspeed of said aircraft, and signal-computing means receiving said first, second, third, and fourth signals as inputs thereto and computing therefrom an output signal proportional to an incremental angle of attack command parameter equivalent to the selected one of said incremental airspeed input increments.

3. Control system as defined in claim 2 wherein said signal-computing means develops incremental angle of attack output signal in response to a selected one of said first input signals thereto and existing ones of said second, third and fourth input signals thereto in accordance with the expression $$\Delta\alpha = [\alpha - \alpha_0]\left[\left(\frac{V_e}{V_e + \Delta V_e}\right)^2 - 1\right]$$

where $\alpha$ is the measured angle of attack, $\alpha_0$ is the angle of attack corresponding to zero lift, $V_e$ is the aircraft airspeed, and $\Delta V_e$ is the incremental airspeed input parameter, whereby said incremental airspeed input parameters modify the control system to effect an aircraft airspeed corresponding to said predetermined function of aircraft stall speed plus a selected one of said incremental airspeed input parameters $\Delta V_e$.

4. A control system as defined in claim 3 including means for computing each of said reference angle of attack and incremental angle of attack parameters as functions of aircraft flap setting.

5. A control system as defined in claim 4 wherein said computing means comprises signal-summing means receiving said experienced airspeed signal and said incremental airspeed signal as respective inputs thereto and providing an output proportional to the sum thereof, signal-dividing means receiving said experienced airspeed signal and the output from said signal-summing means as respective inputs thereto and developing an output proportional to the ratio thereof, squaring amplifier means receiving the output from said signal-dividing means, and producing an output signal proportional to the square of the output from said signal-dividing means, operational amplifier means receiving the output from said signal-squaring means and including a predetermined feedback from the output to the input thereof to produce an output signal proportional to the output of said signal-squaring means less unity, further signal development means receiving first and second input signals respectively proportional to the experienced angle of attack of said aircraft and a predetermined angle of attack input parameter corresponding to zero lift wherein, said further signal development means comprising signal-mixing means receiving said first and second input signals and developing an output signal proportional to the difference therebetween, and further signal-multiplying means receiving the output from said last-named mixing means and the output of said operational amplifier means and producing an output signal comprising said incremental angle of attack signal.

6. A signal conversion means for converting an input signal proportional to a desired incremental aircraft airspeed to an output signal proportional to a corresponding incremental change in aircraft angle of attack, comprising signal-summing means receiving said experienced airspeed signal and said incremental airspeed signal as respective inputs thereto and providing an output proportional to the sum thereof, signal-dividing means receiving said experienced airspeed signal and the output from said signal-summing means as respective inputs thereto and developing an output proportional to the ratio thereof, squaring amplifier means receiving the output from said signal-dividing means and producing an output signal proportional to the square of the output from said signal-dividing means, operational amplifier means receiving the output from said signal-squaring means and including a predetermined feedback from the output to the input thereof to produce an output signal proportional to the output of said signal-squaring means less unity, further signal development means receiving first and second input signals respectively proportional to the experienced angle of attack of said aircraft and a predetermined angle of attack input parameter corresponding to zero lift wherein, said further signal development means comprising signal-mixing means receiving said first and second input signals and developing an output signal proportional to the difference therebetween, and further signal-multiplying means receiving the output from said last-named mixing means and the output of said operational amplifier means and producing an incremental angle of attack output signal equivalent to said incremental airspeed input signal.